Sept. 24, 1968   J. W. BALLENTINE ET AL   3,402,673
PUMP
Filed Oct. 10, 1966
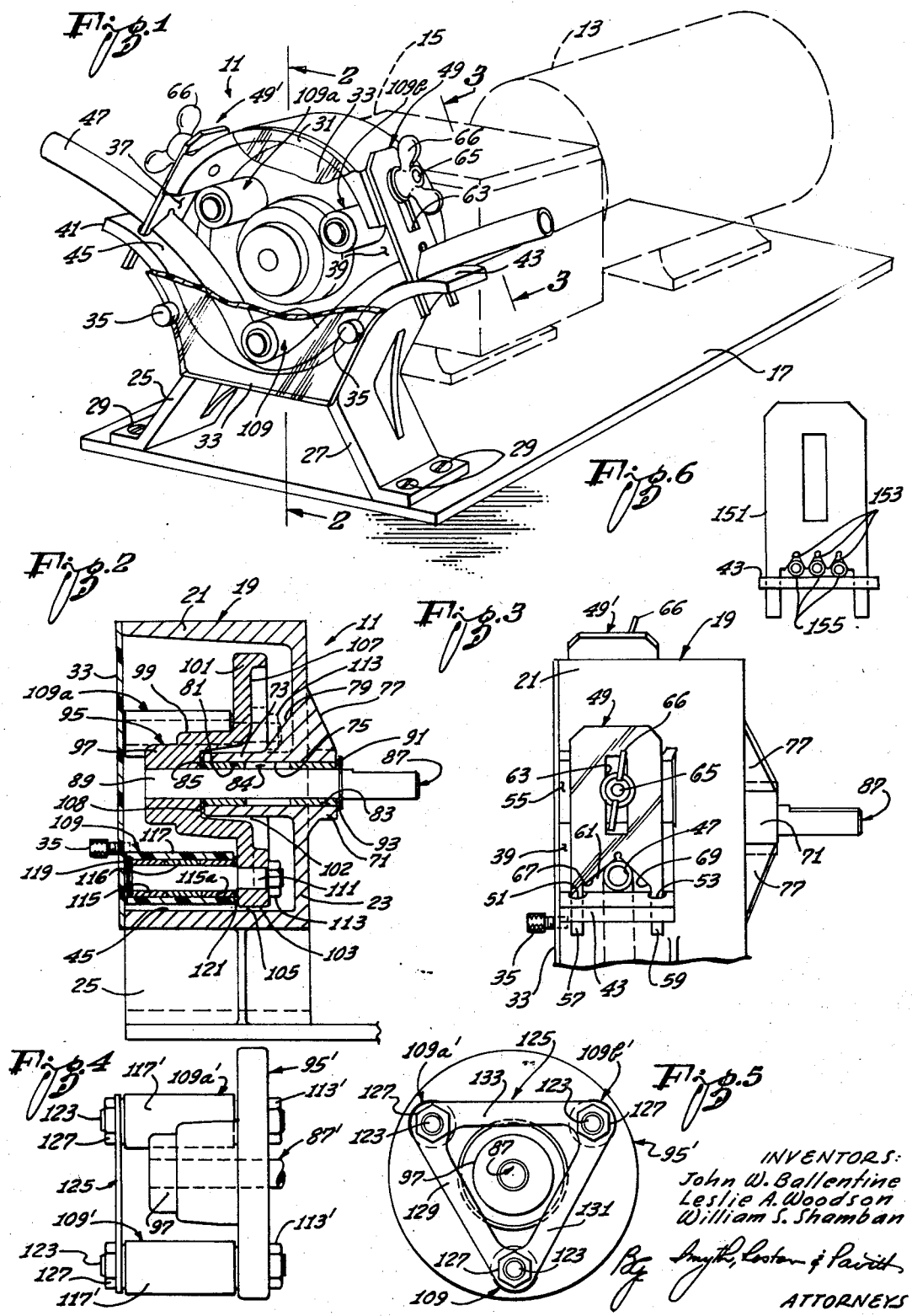
INVENTORS:
John W. Ballentine
Leslie A. Woodson
William S. Shamban
ATTORNEYS 3,402,673
PUMP
John W. Ballentine, Manhattan Beach, Leslie A. Woodson, Long Beach, and William S. Shamban, Pacific Palisades, Calif., assignors to W. S. Shamban & Co., West Los Angeles, Calif., a corporation of California
Filed Oct. 10, 1966, Ser. No. 585,505
17 Claims. (Cl. 103—149)

This invention relates to a pump and more particularly to a pump in which the components thereof do not contact the material being pumped. Although almost any fluid and many granulated or powdered materials may be pumped with this type of device, it is particularly useful for pumping products such as food and sterile fluids which might be contaminated by direct contact with the pump. It is also useful for products such as cottage cheese which should not be subjected to shearing forces. Corrosives, abrasives, paints, glues, gases, or materials that might damage or foul the pump if allowed to make contact therewith, can also be pumped with devices of this type.

Pumps of this general type may include a housing, a bearing positioned externally of the housing, a rotatable shaft supported by the bearing, a rotor mounted on the shaft for rotation therewith, and one or more impeller elements secured to the rotor. A tube carrying the material to be pumped extends through the housing. As the shaft rotates, the impeller element continuously progressively engages adjacent sections of the tube to force the material therethrough.

Some of the difficulties with prior art pumps of this type arise from positioning of the bearings externally of the housing and spacing the bearing from the portion of the rotor that is secured to the shaft. Thus, the portion of the shaft having the rotor affixed thereto extends in cantilever fashion from the bearing thereby providing a large moment arm. When the pump is in use, considerable force is required to rapidly continuously compress adjacent portions of the tube that extend through the pump. This force must be absorbed by the bearings. In the prior art construction, this force is applied to the shaft at a point spaced considerably axially of the bearings. Thus, this force acts through a relatively long moment arm to substantially increase bearing wear and reduce bearing life. An additional disadvantage of this prior art construction is that the external bearing increases the overall width of the pump.

The tube used with this type of pump is subjected to substantial wear by virtue of its being repeatedly forcibly compressed by the impeller elements of the pump. Thus, the tubes are subject to developing cracks or leaks or otherwise failing. When the tube fails, the fluid being handled thereby can leak into the pump housing and may, even if seals are provided, reach the bearing of the pump and shaft. As the fluid may be harmful to the bearings and shaft, it is desirable to prevent leakage from the tube from contacting the bearing. The prior art pumps of this type are deficient in this respect.

It is also desirable that the pump be capable of utilizing tubes of various sizes and in some instances use several integral or separate tubes simultaneously. The prior art pumps are deficient in that little or no flexibility is permitted in selecting the size or number of tubes that is to be used with a particular pump. In addition, many of the prior art pump designs utilize relatively complex rotors and pumping elements which necessarily increase the time for and the cost of production.

According to the present invention, a pump of the type described generally hereinabove is provided in which the bearings thereof are subject to less wear than prior art pumps of this same general type. The bearings of the pump are located within the pump housing and the overall width of the pump is small so that it can be easily used in cramped quarters. In the event of a tube failure, the fluid leaking from the tube cannot creep to the bearing of the pump to cause damage thereto. Any fluid that does creep to the area adjacent the bearing is thrown outwardly away from the bearing by centrifugal force. Various numbers and sizes of tubes may be used with the pump of this invention and the tubes can be easily installed and removed. The above noted advantages are accomplished notwithstanding a general simplification of the overall pump design.

The invention in one preferred form includes a pump housing having an end wall with an aperture therethrough, bearing means secured to the end wall of the housing in general alignment therewith, a shaft rotatably mounted by the bearing, a rotor secured to the shaft for rotation therewith, and at least one impeller element secured to the rotor. The impeller element engages the tube which passes through the pump housing to cause movement of the material therethrough.

One of the primary features of this invention is that the bearing is positioned at least partially within the rotor of the pump and very close thereto. Thus, the loads applied by the rotor to the shaft are applied very close to the bearing to produce less wear on the bearing. Also, by positioning the bearing at least partially within the rotor, the overall width of the pump can be substantially reduced. Thus, the bearing and rotor are overlapping rather than in spaced side-by-side relationship.

This feature may be accomplished by providing an impeller which includes a hub portion secured to the shaft closely adjacent the bearing and an outer portion that extends generally axially of the shaft toward the wall and then outwardly generally radially of the shaft. Thus, the axially extending portion of the rotor surrounds a portion of the bearing and the overall width of the pump is made as small as possible.

The pump housing has a peripheral wall spaced radially outwardly from the shaft and the radially extending portion of the rotor lies closely adjacent thereto. In the event that a leak forms in the tube, it would be very difficult for fluid to creep through this narrow annular clearance space between the rotor and the peripheral wall of the pump housing toward the bearing. However, should any fluid creep through this clearance space and upwardly toward the bearing, the continued rotation of the rotor would tend to impel such fluid radially outwardly away from the bearing by centrifugal force. Thus, the rotation of the rotor tends to prevent fluids from creeping radially inwardly toward the bearing.

The bearing means may include a bearing support which is preferably cast integrally with the end wall of the pump housing and axially aligned with the aperture in the end wall. The bearing support mounts one or more bearings, which may be sleeve bearings, and extends therewith into the axial portion of the rotor.

The pump housing is provided with first and second openings for receiving the tube. Individually adjustable restraining members are provided adjacent each of these openings for accepting tubes of different diameters and for restraining the tube against an undue amount of movement relative to the pump housing. Each of the restraining members permits a wide variation in the number and diameter of tubes that can be used. Each of the restraining members may include a plate-like element having an aperture therein adjacent one of the openings in the housing. A guide member and a cooperating slot are provided on the pump and in the restraining member, respectively, to permit limited movement of the restraining member relative to the tube supports. In this manner, the size of tubes that can be used can be quickly adjusted.

The pump housing also includes a front wall or cover which is removably secured to the peripheral wall. The cover is removable to provide access to the interior of the pump and allows quick and easy installation and removal of the tube. The cover is preferably constructed of a transparent material so that operation of the pump can be directly visually observed.

The impeller elements extend outwardly from the rotor in the axial direction in cantilever fashion, and for pumps of relative high capacity, the axial extent of the impeller elements may be quite substantial. As the force required to repeatedly compress the tube and the material therein may be large, the resultant force applied to the juncture of the impeller element and the rotor may be sufficient to deform the impeller element or otherwise damage the pump. To avoid this, for pumps of relatively high capacity, a rigid plate may be used to rigidly connect the outer end portion of the impeller elements so that each of the impeller elements are supported at both ends thereof. For simplicity, and to reduce the cost of production, it is preferred to keep the rigid plate detached from the rotor.

The invention, both as to its organization and method of operation, together with further features and advantages thereof, may best be understood by reference to the following description taken in connection with the accompanying illustrative drawings in which:

FIG. 1 is a perspective view of a preferred embodiment of a pump constructed in accordance with the teachings of this invention and drive means therefor;

FIG. 2 is a sectional view taken along line 2—2 of FIG. 1 with the tube removed;

FIG. 3 is a side elevational view taken along line 3—3 and illustrating one of the restraining members;

FIG. 4 is a fragmentary side elevational view of a modified form of the pump;

FIG. 5 is a front elevational view of the modified form of the pump; and

FIG. 6 is a fragmentary view similar to FIG. 4 showing a modified form of restraining member.

Referring to the drawings and in particular to FIGS. 1 and 2 thereof, reference numeral 11 designates a pump constructed in accordance with the teachings of this invention. The pump 11 may be driven by an electric motor 13 and a suitable reduction mechanism 15. The pump 11, the motor 13, and the reduction mechanism 15 may all be suitably mounted on a base plate 17.

The pump 11 includes a housing 19 having a generally cylindrical peripheral wall 21 and a generally circular end wall 23 integral therewith. Two legs 25 and 27 depend from the peripheral wall 21 and are attached to the base plate 17 by fasteners 29. The portions of the housing 11 described hereinabove are preferably metal and integrally cast.

The peripheral wall 21 has an annular face front 31 to which a cover 33 is releasably secured by a plurality of screws 35. The cover 33 is preferably constructed from a transparent material such as a transparent plastic so that the operation of the pump can be visually observed.

The peripheral wall 21 of the housing 11 has two generally opposed laterally extending openings 37 and 39 formed therein. A pair of ear-like tube supports 41 and 43 are integral with the peripheral wall 21 and extend outwardly immediately beneath the openings 37 and 39, respectively. The peripheral wall 21 has a lower smoothly curved generally semicylindrical interior surface 45 which smoothly curves laterally outwardly at the ear-like tube supports 41 and 43.

The housing 19 is adapted to receive a flexible compressible tube 47 as shown in FIG. 1. The tube 47 may be constructed of various materials such as urethane, neoprene, polyvinylchloride, rubber, etc. depending upon the type of material that is to be pumped therethrough. As shown in FIG. 1, the tube 47 enters the opening 37 and lies generally along the interior surface 45 of the peripheral wall 21 and then extends outwardly through the opening 39 to the exterior of the housing.

As explained more fully hereinbelow, the tube 47 is subjected to various forces during pumping which tend to move the tube relative to the pump 11. To prevent such movement of the tube 47, a pair of identical restraining members 49 and 49' are provided adjacent the openings 39 and 37, respectively. Because the restraining members are identical, only one of them is described in detail, and corresponding primed reference characters are utilized to designate corresponding portions of the member 49'.

As best seen in FIG. 3, the tab 43 has a pair of ports 51 and 53 extending generally vertically therethrough. The peripheral wall 21 is provided with a thickened portion 55 immediately above the opening 37, the outer surface of the thickened portion 55 being generally planar.

The restraining member 49 is an elongated plate-like member of aluminum or other suitably formed material and has a pair of downwardly extending legs 57 and 59 that define a cutout section or aperture 61 therebetween. An elongated groove 63 is formed in the restraining member 49 immediately above the aperture 51. As shown in FIG. 3, the legs 57 and 59 extend through the ports 51 and 53, respectively, so that a portion of the aperture 61 registers with the opening 39. A portion of the restraining member 49 rests on the thickened portion 55 and is secured thereto by a screw or guide member 65 which is received in the peripheral wall 21 of the housing 19. The screw 65 has an enlarged head 66. The desired position of the restraining member 49 can be accurately and firmly fixed by tightening of the screw 65 which firmly clamps the restraining member between the head 66 thereof and the thickened portion 55 of the housing 19. Thus, each of the restraining members can be individually adjusted to cause the tube 47 to be restrained or clamped to the extent necessary.

The aperture 61 preferably has inclined edges 67 and 69 which intersect to form an angle of slightly more than 90°. This allows tubes of various sizes to be restrained against movement laterally of the tube. It is apparent that by moving the restraining member 49, tubes of various sizes may be utilized in the pump 11. For example, in one particular embodiment, the tube diameters can be varied over 100% as from 3/8" internal diameter to 7/8" internal diameter. Likewise, more than one of the tubes 47 may be used simultaneously if desired. Of course, the restraining member 49' operated in an identical manner to restrain another portion of the tube adjacent the opening 37.

The housing 19 also includes an external boss 71 and an internal boss 73 which together form a bearing support. The end wall 23 has an aperture 75 extending therethrough and the bosses 71 and 73 are axially aligned therewith. As shown in FIG. 3, the boss 71 is reinforced by three webs 77 (only two being shown) and the internal boss 73 is similarly supported by three webs 79 (only one being shown in FIG. 2). As shown in FIG. 2, the internal boss 73 extends a substantial distance into the housing 19 while the internal boss 71 has a relatively short axial dimension.

The bosses 71 and 73 rigidly support two annular sleeve bearings 81 and 83 at the inner and outer ends thereof. The bearings 81 and 83 and the bosses 71 and 73 together form bearing means for the pump 11. Preferably, the bearings 81 and 83 are axially spaced as shown in FIG. 2 to provide an annular space 84 which may be used as an oil reservoir. The bearing 81 has an inner annular end 85 which is flush with the inner end of the boss 73. Ball bearings are not required. However, bearings of the antifriction type may be used in several applications.

A shaft 87 is rotatably mounted by the sleeve bearings 81 and 83. The shaft 87 has an inner end portion 89 which extends inwardly into the housing 19 beyond the inner end 85 of the bearing 83. The other end of the shaft 87 protrudes axially beyond the external boss 71 and can be suitably drivingly connected to the reduction mechanism 15. A retaining ring 91 serves to hold the shaft 87 within the bearings 81 and 83 and an annular seal 93 is provided intermediate the retaining ring and the bearing 83.

A rotor 95 is secured to the end portion 89 of the shaft 87 by any suitable means. The rotor 95 is preferably integrally cast from a suitable metal. The rotor 95 includes an annular hub portion 97 that is secured to the end portion 89, an annular or axial portion 99 and a flange portion 101. The portions 99 and 101 form an outer portion of the rotor 95. As shown in FIG. 2, the axial portion 99 is hollow and generally cylindrical. The axial portion 99 extends from the hub 97 generally axially of the shaft 87 toward the end wall 23 to form a recess 102. The axial portion 99 thus surrounds the bearing 81 and a portion of the internal boss 73. The flange portion 101 is integral with the axial portion 99 and is an annular plate-like circular member. The flange portion 101 extends radially outwardly from the end of the axial portion 99 remote from the hub portion 97 and terminates in a peripheral edge 103 which is separated only slightly from the peripheral wall 21 to form a narrow annular clearance space 105. The flange portion 101 has a rear surface 107 which is spaced slightly from the end wall 23.

The hub portion 97 is spaced from the bearing 81 and the boss 73 by a seal 108, the thin seal 108 being sandwiched between the bearing 81 and the hub 97 so that the hub is positioned as close as possible to the bearing.

Three impeller elements 109, 109a and 109b are secured to the flange portion 101 of the rotor 95 adjacent the peripheral edge 103. Each of the impeller elements is identical, and accordingly, only the impeller element 109 is described in detail. Although it is preferred to utilize three of the impeller elements spaced 120° apart, other numbers and spacings thereof may be used, if desired. Similarly, various impeller element constructions can be utilized, the one being illustrated being merely exemplary.

As shown in FIG. 2, the impeller element 109 includes a pin or stub shaft 111 secured to the flange portion 101 by a nut 113 and extending axially of the shaft 87 and perpendicular to the flange portion 101. A pair of sleeve bearings 115 and 115a are axially set apart by a spacer 116 and are telescoped over the pin 111. The sleeve bearings 115 and 115a and a sleeve 117 fit around the pin 111 and are rotatable together about the pin with the axis of rotation being parallel to the axis of rotation of the rotor 95. The sleeve bearings 115 and 115a and the sleeve 117 are retained on the pin 111 by a generally annular retainer 119 and are spaced slightly from the flange portion 101 by a spacing ring 121.

In operation of the pump, the cover 33 is removed and the tube 47 is forced beneath the impeller element 109 as shown in FIG. 1. The restraining members 49 and 49' are adjusted so that the portions of the tube 47 thereadjacent will be restrained or clamped to the extent desired. The tube 47 will then lie generally along the interior surface 45. The cover 33 is then secured to the face 31 of the peripheral wall 21 and the pump 11 is ready for use.

The motor 13 is drivingly connected to the shaft 87 through the reduction mechanism 15. Thus, energization of the motor 13 causes rotation of the shaft 87 within the bearings 81 and 83. The rotor 95 rotates with the shaft 87 and carries the impeller elements therewith. As the impeller element 109 begins its rotational movement about the axis of the shaft 87, it continuously progressively compresses portions of the tube to force the material therein through the tube. Assuming that the rotor 95 is rotating clockwise as viewed in FIG. 1, the impeller element 109b will contact the tube 47 after a small amount of rotation of the rotation of the rotor. Thus, the impeller elements sequentially engage the tube 47 to continuously force material therethrough. The impeller elements 109, being rotatable about the pins 111, roll over the tube 47.

The embodiment of FIGS. 4 and 5 is particularly adapted for relatively high capacity pumps where the impeller elements extend a substantial distance in the axial direction from the rotor. Except as specifically noted herein, the embodiment of FIGS. 4 and 5 is identical to the embodiment of FIGS. 1–3 and corresponding primed reference characters have been utilized in FIGS. 4 and 5 to designate corresponding part.

In the form of invention shown in FIGS. 4 and 5, three impeller elements 109', 109a' and 109b' are secured to a rotor 95' in the same manner as described above in connection with FIGS. 1–3. The impeller elements shown in FIGS. 4 and 5 are axially longer than the impeller element described in the previous embodiment and each of the former include a pin 111' and a sleeve 117' with the pin extending slightly axially beyond the sleeve to provide a threaded impeller end portion 123. A rigid apertured triangular plate 125 is mounted on the end portions 123 and is secured thereto by nuts 127 which are received on the end portions. As shown in FIG. 4, the end portions 123 lie axially beyond the hub 97, and the plate 125 is spaced and detached therefrom. Preferably, the plate 125 has a cut-out central portion as shown in FIG. 5 to form the plate into a triangular link having leg portions 129, 131, and 133 of equal length for interconnecting each of the impeller elements with the other two. The particular shape of the plate 125 can be varied to accommodate the number and spacing of the impeller elements.

In use, when one of the impeller elements, e.g., the impeller element 109' compresses the tube 47 and the material therein, a force is applied to the impeller element 109'. The plate 125 acts to transfer some of this force from the impeller element 109' to the other two impeller elements. Thus, the impeller element is supported at both ends and the juncture of the element 109' and the rotor 95 is stressed a substantially lesser amount than if the plate 125 were not utilized.

FIG. 6 illustrates a restraining member 151 which is identical to the member 49 except that the three downwardly opening V-shaped notches 153 are formed therein rather than the single notch formed by the edges 67 of the member 49. Thus, the member 131 is adapted to cooperate with the tube support 43 to simultaneously restrain three separate tubes 155 within the pump 11. This feature of the invention allows the pump 11 to simultaneously pump three different fluids, one through each of the tubes 155. Of course, different numbers of notches 153 may be employed.

Although an exemplary embodiment of the invention has been shown and described, many changes, modifications and substitutions may be made by one having ordinary skill in the art without necessarily departing from the spirit and scope of this invention.

What is claimed is:
1. In a pump adapted to force material through a compressible tube, the combination of:
 a hollow pump housing, a section of the compressible tube being positionable within said pump housing;
 bearing means on said pump housing extending into the interior of said pump housing;
 a shaft rotatably mounted by said bearing means and having an end portion extending inwardly into said pump housing;
 a rotor having a hub portion mounted for rotation with said end portion of said shaft, said rotor having an outer portion secured to said hub portion and extending generally radially outwardly of said hub portion and in one direction generally axially of said shaft to cause at least a portion of said bearing means to lie within said outer portion of said rotor; and
 impeller means secured to said outer portion of said rotor and engageable with the section of the com- pressible tube for compressing the tube and causing the material to move through the tube.

2. A combination as defined in claim 1 wherein said outer portion of said rotor includes an axial portion secured to said hub portion and extending generally axially of said shaft, said axial portion at least partially surrounding said portion of said bearing means, said outer portion of said rotor also including a flange portion secured to said axial portion and extending generally radially of said shaft, said impeller means being secured to said flange portion.

3. A combination is defined in claim 2 wherein said flange portion is connected to said axial portion adjacent the end thereof remote from said hub portion and said impeller means extends in the axial direction away from said flange portion and toward said hub portion.

4. A combination as defined in claim 2 wherein said pump housing has a peripheral wall and an end wall, said bearing means being secured to said end wall and surrounded by said peripheral wall, said outer portion including a plate-like flange portion having a peripheral edge closely adjacent said peripheral wall of said pump housing at substantially all points along said peripheral edge whereby said bearing means is substantially completely protected from any of the material which may leak from the tube into the pump housing.

5. A combination as defined in claim 1 wherein said pump housing has first and second openings therein through which the compressible tube extends and individual plate-like restraining members are provided for restraining the tube against an undue amount of movement thereof relative to said pump housing.

6. In a pump adapted to force material through a compressible tube, the combination of:
   a hollow pump housing having an end wall with an aperture therein, a section of the compressible tube being positionable within said pump housing;
   bearing means supported by said pump housing in general alignment with said aperture, said bearing means extending into the interior of said pump housing and terminating in an inner end;
   a shaft extending through said aperture and rotatably mounted by said bearing means, said shaft having an end portion extending inwardly into said pump housing beyond said inner end of said bearing means;
   a rotor having a hub portion secured to said end portion of said shaft closely adjacent said inner end of said bearing means, said rotor having an outer portion secured to said hub portion and extending generally radially outwardly of said hub portion and generally axially of said hub portion toward said end wall of said pump housing, a portion of said bearing means lying within said outer portion of said rotor, said rotor being rotatable with said shaft; and
   impeller means secured to said outer portion of said rotor and engageable with the section of the compressible tube for compressing the tube and causing the material to move through the tube.

7. A combination as defined in claim 1 wherein said bearing means includes a bearing support secured to said end wall of said pump housing and extending into the interior of said pump housing and an annular bearing mounted within said bearing support, said bearing support terminating closely adjacent said hub portion of said rotor.

8. A combination as defined in claim 1 wherein said pump housing has a peripheral wall secured to said end wall and said outer portion includes a plate-like member having a peripheral edge closely adjacent said peripheral wall of said pump housing at substantially all points along said peripheral edge whereby said bearing means is substantially completely protected from any of the material which may leak from the tube into the pump housing.

9. A combination as defined in claim 6 wherein said impeller means includes at least two impeller elements secured to said outer portion, each of said impeller elements extending generally in the axial direction away from said end wall axially beyond said hub portion and terminating in an impeller end portion and rigid means are secured to each of said impeller end portions for rigidly interconnecting said impeller end portions to support each of said impeller elements adjacent said impeller end portion thereof.

10. In a pump adapted to force material through a compresible tube, the combination of:
    a hollow pump housing having first and second openings therein, the compressible tube being extendible into said pump housing through said first opening and out of said pump housing through said second opening thereby providing a section of the compressible tube within said pump housing;
    means within said pump housing for progressively compressing the section of the compressible tube to force the material therethrough;
    a restraining member having an aperture therein adjacent one of said openings and in communication therewith, the tube being extendible through said aperture and restrained by said restraining member;
    a guide member and a cooperating elongated groove on said pump housing and said restraining member, said guide member being received in said groove of said restraining member to permit limited movement of said restraining member relative to said pump housing; and
    means for securing said restraining member to said pump housing.

11. A combination as defined in claim 10 wherein said guide member and said groove are on said pump housing and said restraining member respectively.

12. A combination as defined in claim 11 wherein said pump housing has a tab portion adjacent the lower edge of said one opening, said tab having a pair of ports therein, said restraining member having a pair of legs that extend downwardly through said ports and at least partially define said aperture, said last mentioned means including means on said guide member for clamping said restraining member against said pump housing.

13. A combination as defined in claim 10 wherein a second restraining member is provided adjacent the other of said openings, the position of each of said restraining members relative to said pump housing being separately controllable to provide a tension on the tube and to align the tube in the area in which it is compressed.

14. In a pump adapted to force material through a compressible tube, the combination of:
    a supporting structure, a section of the compressible tube being supportable by said supporting structure;
    a rotor;
    means for mounting said rotor on said supporting structure for rotation relative thereto about a rotational axis;
    at least two impeller elements engageable with the section of the tube, each of said impeller elements having an end portion and being secured to said rotor for rotation therewith, each of said impeller elements extending away from said rotor and being engageable with the section of the compressible tube during the rotation of said rotor to forcibly compress the tube and force the material therethrough; and
    rigid means free from attachment to said rotor secured to each of said end portions of said impeller elements for rigidly interconnecting said end portions to support each of said impeller elements adjacent said end portion thereof.

15. A combination as defined in claim 14 wherein each of said impeller elements includes a shaft and a sleeve rotatably mounted on said shaft, each of said shafts being secured to said rotor and terminating in one of said end portions.

16. In a pump adapted to force material through a compressible tube, the combination of:
a hollow pump housing, a section of the compressible tube being positionable within said pump housing;
bearing means on said pump housing positional in said pump housing;
a shaft rotatably mounted by said bearing means and having an end portion extending inwardly into said pump housing;
a rotor having a hub portion mounted for rotation with said end portion of said shaft, said rotor having an outer portion secured to said hub portion and extending generally radially outwardly of said hub portion;
impeller means secured to said outer portion of said rotor and engageable with the section of the compressible tube for compressing the tube and causing the material to move through the tube;
clamping means comprising a plate-like restraining member mounted on said housing; and
a tube support extending from and integral with said housing adjacent the restraining member and cooperating therewith to restrain the tube.

17. A combination as defined in claim 16 wherein said restraining member has a plurality of notches therein opening toward the tube support, each of said notches being adapted to receive a separate tube.

References Cited

UNITED STATES PATENTS

| | | | |
|---|---|---|---|
| 125,442 | 4/1872 | Darker | 91—57 |
| 459,002 | 9/1891 | Hales | 103—149 |
| 2,251,235 | 7/1941 | Weydell | 103—149 |
| 2,488,573 | 11/1949 | Wood | 230—168 |
| 3,011,684 | 12/1961 | Corneil | 103—149 |
| 3,137,240 | 6/1964 | Hunt | 103—149 |
| 3,140,666 | 7/1964 | Currie | 103—149 |

FOREIGN PATENTS

| | | |
|---|---|---|
| 713,239 | 8/1954 | Great Britain. |
| 897,022 | 5/1962 | Great Britain. |

FRED C. MATTERN, JR., *Primary Examiner.*
WILBUR J. GOODLIN, *Assistant Examiner.*